(12) United States Patent
Schnase et al.

(10) Patent No.: US 11,501,394 B1
(45) Date of Patent: Nov. 15, 2022

(54) SYSTEM AND METHOD FOR PROVIDING AN IMPROVED EARTH OBSERVING SYSTEM FORWARD PROCESSING DATA ANALYTIC SERVICE

(71) Applicant: United States of America as represented by the Administrator of NASA, Washington, DC (US)

(72) Inventors: John L. Schnase, Greenbelt, MD (US); Daniel Q. Duffy, Greenbelt, MD (US); Glenn S. Tamkin, Falls Church, VA (US); Jian Li, Falls Church, VA (US); Savannah L. Strong, Falls Church, VA (US); Roger Gill, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 495 days.

(21) Appl. No.: 16/730,389

(22) Filed: Dec. 30, 2019

Related U.S. Application Data

(63) Continuation-in-part of application No. 14/711,137, filed on May 13, 2015, now Pat. No. 10,339,114.

(51) Int. Cl.
*H04L 9/08* (2006.01)
*G06Q 50/26* (2012.01)
*G06N 5/02* (2006.01)

(52) U.S. Cl.
CPC .............. *G06Q 50/26* (2013.01); *G06N 5/02* (2013.01); *H04L 9/088* (2013.01)

(58) Field of Classification Search
CPC .......... G06Q 50/26; G06N 5/02; H04L 9/088
See application file for complete search history.

(56) References Cited

U.S. PATENT DOCUMENTS

2016/0335291 A1* 11/2016 Schnase ................ G06F 16/182

FOREIGN PATENT DOCUMENTS

EP        3989383 A1 *  4/2022

* cited by examiner

*Primary Examiner* — Joseph E Dean, Jr.
(74) *Attorney, Agent, or Firm* — Christopher O. Edwards; Bryan A. Geurts; Helen M. Galus (57) ABSTRACT

A reanalysis ensemble service includes a plurality of conversion utilities, each conversion utility configured to convert a specific one of a plurality of disparate climate data collections from different sources to common format files that are temporally and spatially registered, where the disparate climate data collections include reanalysis data sets and forward processing data products, a data analytics platform for storing and operating on the different sourced common format files, a service interface for mapping service requests to analytic operations performed on the different sourced common format files by the data analytics platform, and a services library that dynamically creates data objects from one or more of the different sourced common format files in response to the analytic operations, and delivers the data objects to the service interface.

20 Claims, 5 Drawing Sheets

SYSTEM AND METHOD FOR PROVIDING AN IMPROVED EARTH OBSERVING SYSTEM FORWARD PROCESSING DATA ANALYTIC SERVICE

INVENTION BY GOVERNMENT EMPLOYEE(S) ONLY

The invention described herein was made by one or more employees of the United States Government, and may be manufactured and used by or for the Government for governmental purposes without the payment of any royalties thereon or therefor.

ORIGIN OF THE INVENTION

Field

The present disclosure relates to climate data analytic services and more specifically to providing a Reanalysis Ensemble Service that includes access to a set of forecast data products.

Background

The NASA Modern-Era Retrospective Analysis for Research and Applications (current version: MERRA-2) is a climate reanalysis dataset of great value to society. The MERRA-2 dataset integrates global data from a variety of satellite systems with numerical models to produce a temporally and spatially consistent synthesis of climate variables that are not easily observed. The MERRA-2 dataset covers the modern era of remotely sensed data, from 1979 to the present. The breadth of MERRA-2 variables, which include atmosphere, ocean, and land surface products, makes the MERRA-2 dataset ideal for investigating climate variability and for use in an expanding array of applications areas, such as national disasters, civil engineering, ecological forecasting, health and air quality, water resources, and agriculture, for example.

A data analytics platform has been developed that provides a distributed file system for storing MERRA-2 datasets, and provides high performance operations for operating on the MERRA-2 datasets. The data analytics platform generally includes a sequencer that transforms the climate data, a desequencer that transforms serialized block compressed sequence files between data formats, a services library of applications that dynamically create data objects from the data as reduced final results, and a utilities library of software applications that process flat serialized block compressed sequence files. The data analytics platform also includes a service interface through which a client device can access the climate data via the data analytics platform.

The NASA Goddard Earth Observing System, Version 5 (GEOS-5) "Forward Processing" system generates analyses, assimilation products, and ten-day forecasts with the most up-to-date validated version of GEOS that is available. The forward processing system allows NASA Global Modeling and Assimilation Office (GMAO) scientists to test their forefront modeling and analysis developments in a near-real-time system. To support NASA's satellite missions and field experiments, the GMAO generates near-real time atmospheric products using GEOS and distributes them to a broad community of users. While these products emphasize the traditional aspects of weather analysis and forecasting, they have a broader scope that includes aerosols and trace gases. To enhance the quality of these near-real-time products, GMAO conducts research and development activities into atmospheric data assimilation and forecast model development.

SUMMARY

It would be advantageous to provide an extended capabilities data analytics platform that delivers a service that operates over an ensemble of climate data collections that include various reanalysis datasets and forward processing data products and provides a set of intercomparison analytics, and provides the ability to conduct intercomparisons among forward processing results and conduct intercomparisons among forward processing results and results from one or more reanalysis collections.

The disclosed Reanalysis Ensemble Service offers a basic set of commonly used operations over multiple reanalysis collections and forward processing data products that are accessible through NASA's climate data analytics web services and a client-side Climate Data Services Python library, CDSlib. Accessibility to multiple collections allows for general reanalysis queries in addition to inter-comparisons among reanalysis and forward processing results.

In at least one aspect, the disclosed embodiments are directed to a reanalysis ensemble service including a plurality of conversion utilities, each conversion utility configured to convert a specific one of a plurality of disparate climate data collections from different sources to common format files that are temporally and spatially registered, where the disparate climate data collections include reanalysis data sets and forward processing data products, a data analytics platform for storing and operating on the different sourced common format files, a service interface for mapping service requests to analytic operations performed on the different sourced common format files by the data analytics platform, and a services library that dynamically creates data objects from one or more of the different sourced common format files in response to the analytic operations, and delivers the data objects to the service interface.

In at least one other aspect, the disclosed embodiments are directed to a method of providing a climate data reanalysis ensemble service, including converting a plurality of disparate climate data collections from different sources to a common format using individual conversion utilities configured to convert a specific one of the plurality of disparate climate data collections from different sources to common format files that are temporally and spatially registered, wherein the disparate climate data collections include reanalysis data sets and forward processing data products, storing and operating on the different sourced common format files using a data analytics platform, using a service interface to map service requests to analytic operations performed on the different sourced common format files by the data analytics platform, and dynamically creating data objects from one or more of the different sourced common format files in response to the analytic operations, and delivering the data objects to the service interface.

In at least one further aspect, the disclosed embodiments are directed to a system for providing reanalysis ensemble services including a processor, a non-transitory computer readable storage medium storing instructions which when executed by the processor, cause the system to convert a plurality of disparate climate data collections from different sources to a common format using individual conversion utilities configured to convert a specific one of the plurality of disparate climate data collections from different sources to common format files that are temporally and spatially registered, wherein the disparate climate data collections include reanalysis data sets and forward processing data products, store and operate on the different sourced common format files using a data analytics platform, map service requests to analytic operations performed on the different sourced common format files by the data analytics platform, and dynamically create data objects from one or more of the different sourced common format files in response to the analytic operations, and deliver the data objects to the service interface.

DETAILED DESCRIPTION

In order to address current shortcomings in the art, a combination of technologies are disclosed herein to extend the capabilities of the data analytics platform to include the ability to conduct operations over multiple disparate climate data collections, including disparate reanalysis collections and forward processing data products, provide the ability to conduct intercomparisons among forward processing results, and provide the ability to conduct intercomparisons among forward processing results and results from multiple reanalysis collections. The reanalysis collections may include one or more of the following in any combination: NASA Modern Era Reanalysis for Research and Applications Version-2 (MERRA-2), European Centre for Medium-Range Forecasts ECMWF Interim Reanalysis (ERA-Interim), NOAA NCEP Climate Forecast System Reanalysis (CFSR), NOAA ESRL 20th Century Reanalysis (20CR), Japanese 25-year Reanalysis (JRA-25), and Japanese 55-year Reanalysis (JRA-55). The forward processing system may include, for example, more frequently updated GMAO GEOS-5 forecast data products with enhanced temporal and spatial resolution. It should be understood that the reanalysis collections may include any suitable reanalysis collections and that the forward processing data products may include any suitable forward processing data sets. It should be understood that the term disparate climate data collections refers to both the disparate reanalysis collections 107.1-107.6 and the forward processing data products 107.7.

A system, method and a processor with a non-transitory computer readable storage medium are disclosed which provide an analytic service for a variety of climate reanalysis collections and forward processing data products. An example system for providing the Reanalysis Ensemble Service includes a data analytics platform of an assemblage of compute and storage nodes that provide a compute-storage fabric upon which high-performance parallel operations are performed over a collection of climate data stored in a distributed file system, a sequencer that transforms the climate data, a desequencer that transforms serialized block compressed sequence files between data formats. The system includes a services library of applications that dynamically create data objects from the data as reduced final results, and a utilities library of software applications that process flat serialized block compressed sequence files. The system also includes a service interface through which a client device can access the climate data via the data analytics platform.

The Reanalysis Ensemble Service described herein provides an exemplary embodiment of the concept of providing climate data analytics as a service using data from multiple climate reanalysis collections and from forward processing data products. Various modifications and changes may be made to the disclosed embodiments without departing from the broader spirit and scope of the disclosure. In particular, alternative analytic methods may be used as the basis for such a service, and the approach described here can apply to any number of suitable climate reanalysis collections and forward processing data products.

Figure 1:
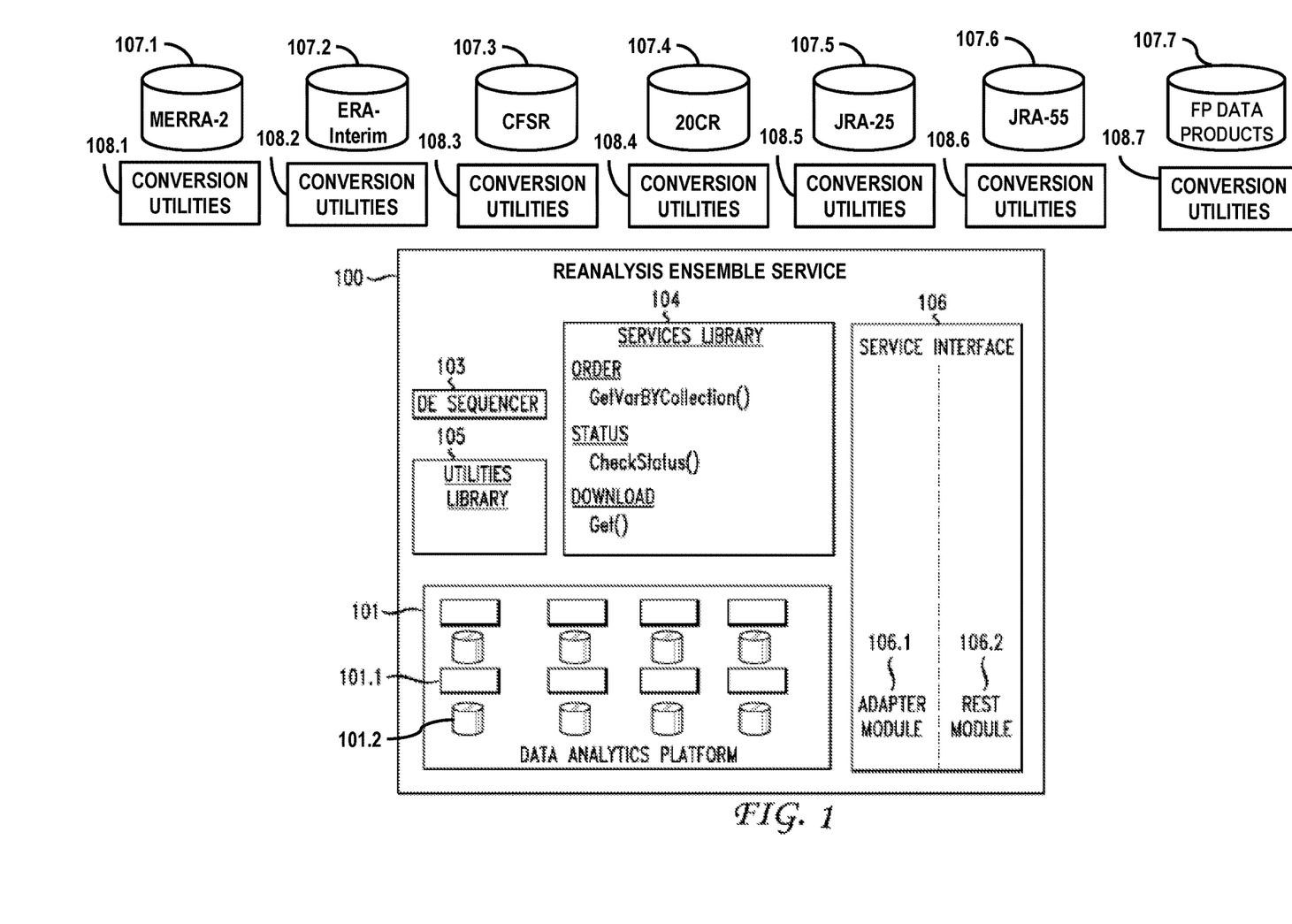
FIG. 1 shows a diagram off an example of a Reanalysis Ensemble Service according to the disclosed embodiments.

FIG. 1 illustrates the overall organization of an example system 100 providing the Reanalysis Ensemble Service. The system 100 can include a high-performance data analytics platform 101, a desequencer 103, a services library 104, a utilities library 105, source data from one or more climate reanalysis collections in any combination, 107.1-107.6, for example, MERRA-2, ERA-Interim, CFSR, 20CR, JRA-25, and JRA-55, source data from one or more forward processing data products 107.7, a set of conversion utilities 108.1-108.7, and a service interface 106.

The high-performance data analytics platform 101 can include data 101.1 originally sourced from the one or more of the climate reanalysis collections and from the one or more forward processing data products and can include one or more data storage devices 101.2. The high-performance data analytics platform 101 provides the storage and compute capabilities required to run the service. The Reanalysis Ensemble Service can support parallel operations, for example, parallel operations utilizing MapReduce analytics; however, alternative configurations are possible so long as they enable high-performance, parallel computing over a distributed file system, for example, a Hadoop file system, and provide the software tools needed to support parallel operation code sets, for example, MapReduce code sets, that implement the capabilities of the system.

One example configuration of the high-performance data analytics platform 101 can be a 367-node Dell cluster of 576 Intel 2.6 gigahertz Sandy Bridge cores, 2304 gigabytes of random access memory, 1296 terabytes of raw storage, and having a 11.7 teraflop theoretical peak compute capacity, wherein nodes communicate through a Fourteen Data Rate Infiniband network having peak Transmission Control Protocol/Internet Protocol speeds in excess of 20 gigabits per second, and an open source Cloudera enterprise-ready distribution of the Apache Hadoop software application of a Hadoop file system and MapReduce engine, wherein Cloudera is integrated with configuration and administration tools and related open source software applications such as Hue, Oozi, Zookeeper, Hive, and Impala.

The desequencer 103 generally operates to transforms the flat, serialized block compressed climate data collection sequence files stored in the distributed file system back into common format files and moves them out of the distributed file system for consumption by a calling program.

The services library 104 may include a plurality of software applications that dynamically create data objects from the data stored in the distributed file system. The services library can provide an order capability in the form of a Get Variable By Collection (GetVarByCollection( ... )) method that can implement a number of commonly-used canonical operations over one or more of the MERRA-2, ERA-Interim, CFSR, 20CR, JRA-25, and JRA-55 reanalysis collections 107.1-107.6 and the forward processing data products 107.7. The services library 104 may also include a status operation including a CheckStatus method that checks on progress of an order request according to user-specified input parameters including a unique session identifier for the target order request. The status operation can return outputs including a unique session identifier for the status session, a one word status update of the session identified by the input session identifier, and a detailed description of a target session. The services library 104 may further include a download operation including a Get method to download a data object that has been dynamically created by an order request according to user-specified input parameters including a unique session identifier for a target order request and an optional name for a resulting data object. The output can be the resulting data object.

The services library 104 can be a set of Java classes which implement the capabilities of the services corresponding to the International Organization for Standards (ISO) Open Archival information System (OAIS) Reference Model data flow categories for an operational archive. Such capabilities include "ingest" capabilities to input data objects to the service, "query" capabilities that retrieve metadata relating to data objects in the service, "order" capabilities that dynamically creates data objects in the service, "download" capabilities that retrieve data objects from a service, "execute" capabilities that initiate service-definable operations, and "status" capabilities that check the progress of an order operation.

The utilities library 105 generally includes a plurality of software applications that can process the flat serialized block compressed sequence files. Several example software applications that can be included in the utilities library are provided herein. One example software application is a sorting application that sorts <key, value> pairs of the sequence files by time and grouped by a main variable field. Other example software applications can include a comparing application that compares variable name and associated timestamps of the <key, value> pairs, and sorts operations over the <key, value> pairs by comparing variable name and grouping variables by variable name, a partitioning application that partitions results from a mapper based on a variable name across a plurality of reducer applications, enabling parallel execution of the reducer applications, a simplifying application that simplifies sequencing and desequencing operations by abstracting operations on the <key, value> pairs from a main code of a MapReduce software application, and a managing application that manages configuration files required to execute MapReduce software applications.

The source data generally originates from the climate reanalysis collections, 107.1-107.6, for example, MERRA-2, ERA-Interim, CFSR, 20CR, JRA-25, and JRA-55, and from the forward processing data products 107.7. The MERRA-2 climate reanalysis dataset is produced by NASA's Goddard Earth Observing System Data Assimilation System Version 5 (GEOS-5) in a Hierarchical Data Format Earth Observing System (HDF-EOS) format, which is an extension of the Hierarchical Data Format Version 4 (HDF-4). The ERA-Interim climate reanalysis data are available in GRIB format on a Gauss grid with the resolution N128. The CFSR and 20CR reanalysis data are available in GRIB-2 format, except for the initial condition data which are in native binary formats. Spanning 1958-present, JRA-55 is the longest third-generation reanalysis. Compared to the previous generation Japanese Meteorological Agency (JMA) reanalysis, JRA-25, JRA-55 uses a more advanced data assimilation scheme. JRA-25 and JRA-55 both use the GRIB-2 format.

Present day typical climate models that project the state of the climate 50 or 100 years in the future have relatively course temporal and spatial resolution. Present day commercial weather forecasting models have higher temporal and spatial resolution and provide near time forecasts typically over 5 or 10 days, but lack the depth of observations available in the climate reanalysis collection. For example, typical weather forecasting models lack aerosol, carbon monoxide, nitrates, and particulate matter climate and transport models, and other models available in the climate reanalysis collections.

The forward processing data products 107.7 according to the disclosed embodiments are based on the same climate observations as the MERRA-2 collection and are advantageous in that they provide the same or better spatial and temporal resolution as the commercial weather forecasting models with the depth of observations available in the MERRA-2 reanalysis collection.

The forward processing data products 107.7 are produced by NASA's Goddard Earth Observing System Data Assimilation System Version 5 (GEOS-5) in an HDF-EOS format. The forward processing products utilize a current GEOS model and are updated as the GEOS system improves. Compared with the reanalysis data collections, for example, MERRA-2, the forward processing products 107.7 have a higher updating frequency and a higher spatial and temporal resolution. For example, the forward processing data products may be updated 4 times/day as opposed to MERRA-2 updates which may occur weekly or monthly, and may provide 10 day forecasts at 00Z, and 5-day forecasts at 12Z, where Z represents Greenwich Mean Time. The forward processing data products may further provide 3-D collections on a $5/16$ by $1/4$ degree longitudinal-latitudinal horizontal grid, with a vertical grid of 42 pressure levels or 72 model grid layers. The forward processing products may additionally provide a 2-D data prediction every hour and a 3-D data prediction every 3 hours.

The forward processing products may operate independently, generating and accumulating a database of predictions on a scheduled basis, for example, a 10 day forecast every 4 hours, a 10 day forecast every day at 00Z, a 5 day forecast every 4 hours, a 5 day forecast every day at 12Z, or any other forecast of any length according to any schedule. The forecasts may utilize any of, or all of, the observations available in the MERRA-2 reanalysis collection.

The set of conversion utilities 108.1-108.7 may be utilized for each of the climate data collections including the climate reanalysis collections 107.1-107.6 and the forward processing dataset 107.7 to convert the datasets to common format files that are temporally and spatially registered, to transform the common format files into the flat, serialized block compressed sequence files required by the parallel operation programs, and to load the sequence files into the distributed file system. In order to execute the parallel operations on the data of the variety of climate data collections, the data first need to be ingested into the distributed filesystem of the compute-storage platform. The climate reanalysis and forward processing datasets are generally disparate in that they may have different formats, variables, geographical and spatial domains, temporal resolutions, and other differences.

The MERRA-2 climate reanalysis dataset is produced by NASA's Goddard Earth Observing System Data Assimilation System Version 5 (GEOS-5) in an HDF-EOS format, which is an extension of the Hierarchical Data Format Version 4 (HDF-4). The ERA-Interim climate reanalysis data are available in GRIB format on a Gauss grid with the resolution N128. The CFSR and 20CR reanalysis data are available in GRIB-2 format, except for the initial condition data which are in native binary formats. Spanning 1958-present, JRA-55 is the longest third-generation reanalysis. Compared to the previous generation Japanese Meteorological Agency (JMA) reanalysis, JRA-25, JRA-55 uses a more advanced data assimilation scheme. JRA-25 and JRA-55 both use the GRIB-2 format. The forward processing dataset is provided in the HDF-EOS format.

The system can convert these disparate source files to common format files, for example, Network Common Data Format (NetCDF) files, used by many applications. NetCDF is a self-describing format that includes both data and metadata. For NetCDF, MapReduce, Hadoop based systems, individual sets of conversion utilities 108.1-108.7 specific to each reanalysis data collection and forward processing data product may be utilized for each disparate climate data collection to convert the NetCDF source files into the flat, serialized block compressed sequence files required by MapReduce programs and to load the sequence files into the Hadoop filesystem (HDFS). The sequence files may be encoded, for example, in one of Bloom, Sequence, or Map file formats.

Figure 2:
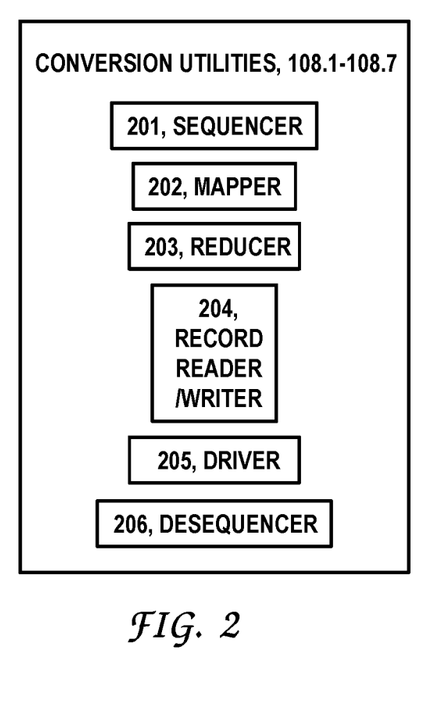
FIG. 2 illustrates individual sets of conversion utilities which may be utilized to convert source files of disparate climate data collections to flat, serialized block compressed sequence files.

As shown in FIG. 2, The individual conversion utilities may include a sequencer utility 201 to temporally and spatially register the raw data and convert the raw data of each the disparate climate data collections to a MapReduce-consumable input format, a mapper class 202 to filter and combine input sequence records, a reducer class 203 to aggregate and transform filtered input records into sequence file output format, a record reader/writer utility 204 for HDFS input/output used by the mapper 202 and reducer 203, a driver class 205 to orchestrate the application at runtime, and a de-sequencer utility 206 to convert reduced sequence files to the proper output format (e.g., NetCDF). It should be understood that the sequencer utility 201, mapper class 202, reducer class 203, record reader/writer utility 204, driver class 205, and de-sequencer utility 206 may be forward processing data products to accommodate the enhanced temporal and spatial resolution of the forecast data products.

The system can create a single custom sequence file for each NetCDF file, wherein the source file's data are logically stored as <key, value> pairs within the resulting sequence file. As a result, each sequence file has a one-to-one mapping to the original NetCDF file. One benefit of this approach is that NetCDF metadata is preserved within the sequence file.

The sequencer utility 201 can operate on a variety of common climate data file formats. The sequence files may be produced by the sequencer utility 201 as Hadoop map files and can be encoded in a variety of common sequence file formats, including Bloom, Sequence, and Map formats. The sequencer utility 201 may partition native climate data collection files by time such that each record in the sequence file may include a composite key including a timestamp and climate variable name that is associated with a value that is the value of the named climate variable. Similarly, the sequencer utility 201 can partition native climate data collection files by other criteria, such as by location, by size, by type, etc., and may temporally and spatially register the data files, with the corresponding changes in the composite key. Depending on the variable and collection type, the variable can represent either a two- or three-dimensional quantity. The sequencer utility 201 can also implement a variety of functions to support the primary capabilities of the sequencer utility 201, such as data preparation and formatting.

In operation, the mapper class 202 may operate to filter each sequence file to capture <key, value> pairs that match the variable and time span of interest. The mapper class may also compares sequence file <key, value> pairs to input selection criteria and pass climate variable values to the reducer class 203 to perform a specified operation. In this case, the reducer module can receive as input <key, value> pair from the mapper module, perform the specified operation on input climate variable values, and write results to a sequence file. The mapper class 202 may also map inputs to a primary node of the data analytics platform into smaller sub-problems, distribute the smaller sub-problems to secondary nodes, process the smaller sub-problems on the secondary nodes such that the smaller sub-problems are processed in parallel, and collect results of the smaller sub-problems into dynamically created data objects that represent reduced final results.

The reducer class 203 may perform calculations based on input parameters and creates new subsets of the filtered sequence files to be stored in the HDFS. The resulting sequence files may then be transformed back into NetCDF by the de-sequencer utility 206 which may transform the flat, serialized block compressed climate data collection sequence files stored in the HDFS back into NetCDF files and move them out of the HDFS for consumption by a calling program. The system 100 can sequence and desequence this binary, multidimensional NetCDF data in an improved manner. The conversion utilities may be implemented as Java classes, however, it should be understood that any variety of alternative approaches may be used.

Returning to FIG. 1, the service interface 106 provides a portal through which a client device can access the disparate climate data collections 107.1-107.7 including the disparate reanalysis collections 107.1-107.6 and the forward processing dataset 107.7 via the services library 104. The service interface 106 can include an adapter module 106.1 that maps service requests from external client software applications to specific capabilities of the data analytics service, and a representational state transfer (REST) server module 106.2 that communicatively links the data analytics service to external client software applications. The adapter module 106.1 can be based on International Organization for Standardization (ISO) Open Archival Information System (DAIS) Reference Model categories. The REST server module 106.2 can communicate with the external client software applications through ISO OAIS Reference Model-based uniform resource locators. In an exemplary embodiment, the RESTful interface 106.2 may be implemented as a PHP program. The communications protocol implemented by the RESTful service may also be based on the OAIS Reference Model's data flow categories.

The Reanalysis Ensemble Service services library 104 may include a collection of methods that implement the core capabilities of the service, such as the order method, status method, and download method described above. The system organizes these methods to contribute to the integrated analytics-archive management perspective of climate data analytics as a service. The functional capabilities of the service may correspond to the Open Archival Information System (DAIS) Reference Model data flow categories of an operational archive. An OAIS is an archive of an organization of people and systems that has accepted the responsibility to preserve information and make it available for a designated community. The term OAIS also refers to the International Standards Organization (ISO) OAIS Reference Model for an OAIS. This reference model is defined by recommendation CCSDS 650.0-B-1 of the Consultative Committee for Space Data Systems (CCSDS); this text is identical to ISO 14721:2003. The CCSDS's purview is space agencies, but the OAIS model it developed has proved useful to a wide variety of other organizations and institutions with digital archiving needs. OAIS provides a framework for the understanding and increased awareness of archival concepts needed for long-term digital information preservation and access and provides the concepts needed by non-archival organizations to be effective participants in the preservation process.

The OAIS-based capability categories used to organize a service's methods can include operations such as ingest, query, order, download, execute, and status. Ingest methods input objects into the system. Query methods retrieve metadata relating to data objects in the service. Order methods dynamically create data objects. Download methods retrieve objects from the service. The execute and status categories accommodate the dynamic nature of a climate data analytics as a service-type archive. Execute methods initiate service-definable operations that can extend the functionality of a service, and status methods check on the progress of running operations.

In the example system 100, the Reanalysis Ensemble Service services library 104 may include the three OAIS categories of capability: order, status, and download. An exemplary order method may be a Get Variable By Collection (GetVarByCollection( . . . )) method that can implement a number of commonly-used canonical operations over one or more of the MERRA-2, ERA-Interim, CFSR, 20CR, JRA-25, JRA-55 reanalysis collections, and the forward processing data products.

The arguments for the GetVarByCollection( . . . ) method may include one or more of the reanalysis collections and the forward processing data products upon which to operate, a temporal and three dimensional spatial extent, the canonical operation to be performed, and any additional parameters needed by the operation.

Exemplary canonical operations may include, for example, maximum, minimum, sum, count, average, variance, and difference operations, as well as others. Additional exemplary canonical operations that may be used over the one or more disparate climate data collections may include:

Maxm2s—Seasonal maximum, meaning: converting monthly climate variable data to seasonal climate variable data (spring-March, April, May; summer-June, July, August; etc.), then selecting the maximum for selected variables for each grid of 30+ years. The output may include one time step, and a spatial extent as per a user request;

Avgm2s—Seasonal average, meaning: converting monthly climate variable data to seasonal climate variable data. Output contains multiple steps as time-span defined;

Vavg—Vertical average, meaning: averaging specified variables across a specified number of vertical levels of the atmosphere;

Aavg—Spatial average, meaning: averaging specified variables over a specified spatial-extent;

Anomaly—In particular, time anomaly, meaning: a deviation of one or more variables at a certain time interval from an average of the one or more variables over a longer time interval;

Std—Standard deviation, a typical statistic measure to quantify the amount of variation of a set of data values;

All of the canonical operations may be enhanced to accommodate the enhanced temporal and spatial resolution of the forecast data products.

The output of the GetVarByCollection( . . . ) method can include a unique session identifier for the order session that can be used to retrieve session status information and download results.

The Reanalysis Ensemble Service's GetVarByCollection( . . . ) method may implement its operations using MapReduce, wherein mapper and reducer programs direct the parallel subsetting and execution of the operations over the climate data collection data stored in the analytic platform's Hadoop filesystem. The system 100 can perform subsetting and other operations in an improved manner. The Reanalysis Ensemble Service's status and download capabilities are implemented by the service library's CheckStatus ( . . . ) and Get ( . . . ) methods. These methods can be used to check on the progress of a running order operation and download the computed results when the operation finishes. The services library 104 may be implemented as Java classes, however, it should be understood that any variety of alternative approaches may be used.

In at least one embodiment, the Reanalysis Ensemble Service 100 may be implemented as a Platform As A Service, that is, a cloud based service, packaged as containers that include code, libraries, and other required dependencies in standalone executable packages. The containers may implement a common packaging approach and typically operate in the same manner regardless of the host operating system or the underlying infrastructure. Docker® is an exemplary tool that may be used for creating, deploying, and running container based applications. The NASA General Application Platform (NGAP) is an exemplary cloud-based Platform-as-a-Service (PaaS) and Infrastructure-as-a-Service (IaaS) that may be suitable for providing the Reanalysis Ensemble Service 100. The NASA Advanced Data Analytics Platform (ADAPT) is another cloud-based PaaS and IaaS that may also be suitable for providing the Reanalysis Ensemble Service 100.

Figure 3:
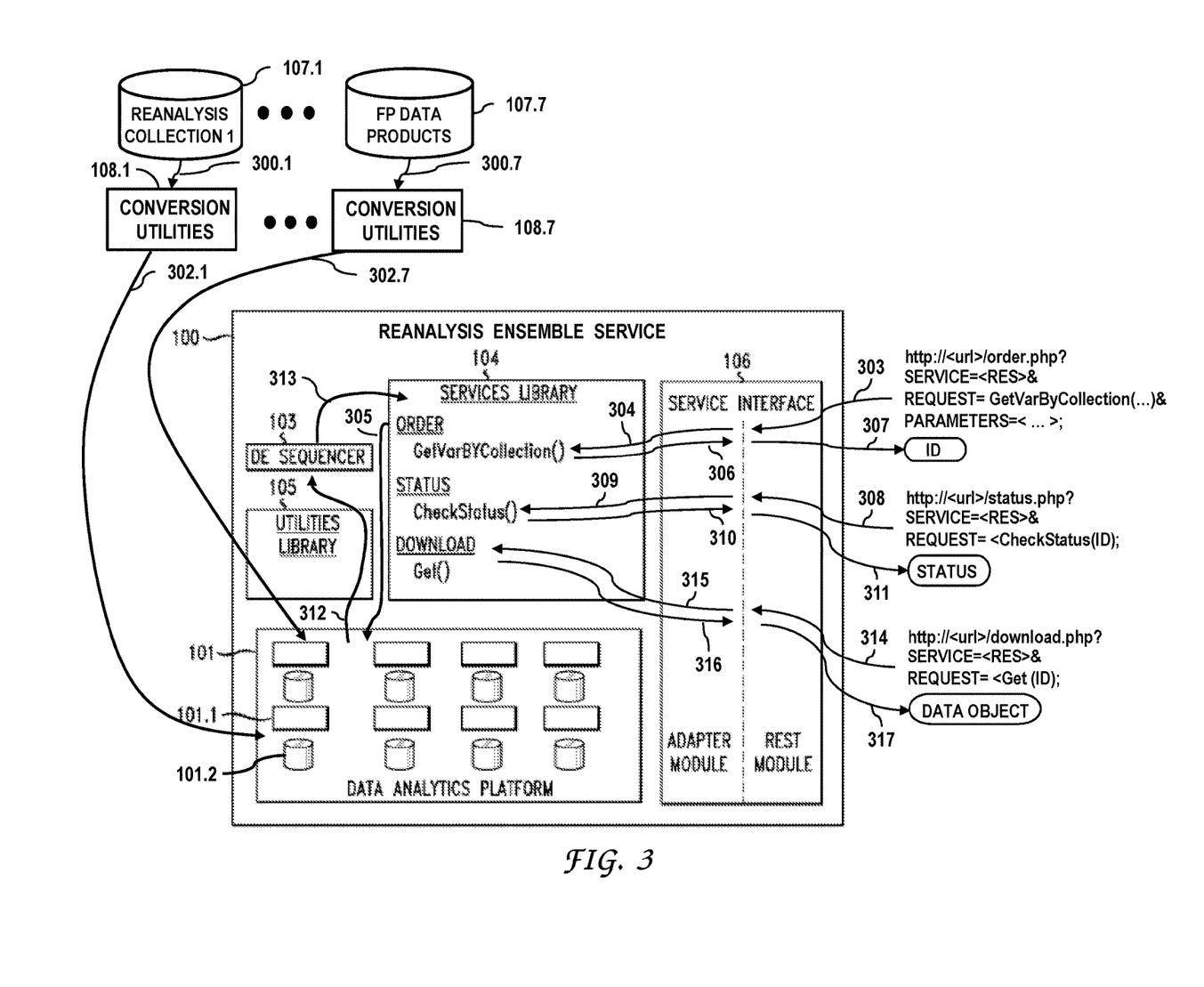
FIG. 3 depicts an exemplary order method that can implement a number of commonly-used canonical operations over a combination of disparate climate data collections.

FIG. 3 illustrates a basic workflow of interactions among the components of the Reanalysis Ensemble Service 100. In a first step 300.1-300.$n$, climate reanalysis source data 107.1-107.6 from one or more of the one or more of the MERRA-2, ERA-Interim, CFSR, 20CR, JRA-25, and JRA-55 climate reanalysis collections, Reanalysis collection 1, or from the forward processing dataset FP Data Products 107.7, alone or in combination, is provided to the associated conversion utilities 108.1-108.7, which transform the source NetCDF files into MapReduce sequence files and loads 302.1-302.7 the sequence files into the Hadoop filesystem of the data analytics platform.

In an example request for a computed data object, a user or application may submit 303 a RESTful order service request to the Reanalysis Ensemble Service 100 via the system interface 106 indicating a get variable operation to perform and arguments that further specify the request. The arguments may include one or more climate variables and one or a combination of the disparate climate data collections upon which to operate. alternately, the arguments may specify the service interface 106 may then map the incoming service request 303 to the appropriate order method 304, in this case the GetVarByCollection( . . . ) method, which may launch 305 the operation as a MapReduce computation on the data analytic platform 101 and return 306 a session identifier (ID) through the interface which may then map the ID 307 to the calling application.

Once the order request is launched, the calling application may issue status service requests 308 which the service interface 106 may map to the CheckStatus method 309 with the session ID to monitor the progress of the order request. The system interface 106 may receive the status 310, and may map the status 311 to the calling application. When the order request is finished, the computed data object may be desequenced by the de-sequencer 103 and the desequenced data object 313 may be converted to a NetCDF file by the services library 104 and prepared for retrieval by the calling application. In a final step, the calling application could then submit a download service request 314 via the system interface 106, which the interface 106 may map to the Get method. The Get method may provide the data 316 extracted from the combination of the disparate climate data collections to the system interface 106 which may then map the data 317 to the calling application.

It should be understood that the request for the computed data object, the order, check status, and download service requests may operate on the forward processing data products 107.7 as well as the MERRA-2, ERA-Interim, CFSR, 20CR, JRA-25, and JRA-55 climate reanalysis collections.

Another exemplary service request may be a forward processing intercomparison request that may map to a Forward Processing Comparison (FPComp( . . . )) order method applicable to the forward processing data products. Such a method would advantageously provide an ability to compare predictions produced by the forward processing data products to determine, for example, if the forward processing model has drifted over time.

The FPComp( . . . )) order method may be implemented using the service interface 106 in conjunction with the service library 104 of the Reanalysis Ensemble Service 100. In at least one embodiment, the FPComp( . . . )) order method may be effected using a Python application that may use a library call to compute the intercomparison results.

The arguments for the forward processing intercomparison request and the FPComp( . . . )) method may include one or more first predictions of a climate variable value generated by the forward processing data products, a three dimensional spatial extent and temporal span, and one or more second predictions of the climate variable value generated by the forward processing data products over the same three dimensional spatial extent, the second predictions having the same temporal span as the one or more first predictions, but offset in time.

Using surface temperature as an exemplary climate variable, the FPComp( . . . )) method may include the following operations:

1) Selecting one or more first forward processing data products that predict an average value of the specified climate variable, for example, surface temperature, over a three dimensional spatial extent.

2) Selecting one or more second forward processing data products that predict an average value of the specified climate variable, for example, surface temperature, over the same three dimensional spatial extent, where the second predictions have the same temporal span as the one or more first predictions, but offset in time.

3) Comparing the predicted average values of the specified climate variable, for example, surface temperature, to determine, for example, if the forward processing model has drifted.

Another exemplary service request may be a reanalysis-forward processing intercomparison request that may map to a Reanalysis-Forward Processing Comparison (Reanalysis-FPComp( . . . )) order method applicable to the forward processing data products and the MERRA-2, ERA-Interim, CFSR, 20CR, JRA-25, and JRA-55 climate reanalysis collections. Such a method would advantageously provide an ability to compare predictions from the forward processing data products with reanalyses performed by the MERRA-2, ERA-Interim, CFSR, 20CR, JRA-25, and JRA-55 climate reanalysis collections.

The disclosed ReanalysisFPComp( . . . )) order method may be implemented using the service interface 106 in conjunction with the service library 104 of the Reanalysis Ensemble Service 100. In at least one embodiment, the ReanalysisFPComp( . . . )) order method may be effected using a Python application that may use a library call to compute the comparison results.

The arguments for the reanalysis-forward processing comparison request and the ReanFPComp( . . . )) method may include one or more first predictions of a climate variable value generated by the forward processing data products, a three dimensional spatial extent and temporal span, and one or more of the reanalysis collections having the same climate variable over the same three dimensional spatial extent, and a temporal span within the one or more reanalysis collection having the same length as the temporal span of one or more first predictions.

Using surface temperature as an exemplary climate measurement, the ReanFPComp( . . . )) method may include the following operations:

1) Selecting one or more forward processing data products that predict an average of the specified climate variable, for example, surface temperature, over a three dimensional spatial extent, and a temporal span extending forward.

2) Calculating an average of the specified climate variable, for example, surface temperature, from individually specified climate reanalysis collections, or a combination of specified climate reanalysis collections, over the three dimensional spatial extent, and a temporal span within the one or more reanalysis collection having the same length as the temporal span of one or more first predictions.

3) Comparing the predicted average of the specified forward processing climate variable and the calculated average of the specified climate variable to determine, for example, whether any of the models of the climate reanalysis collections or forward data processing products need refinement.

Figure 4:
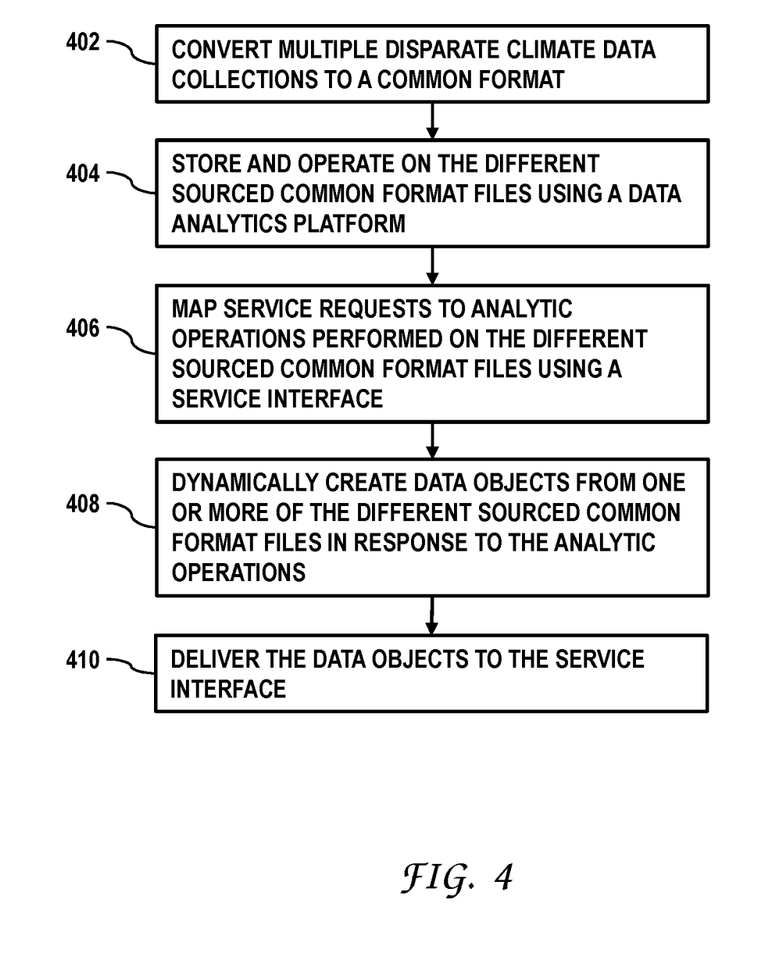
FIG. 4 depicts an exemplary method according to the disclosed embodiments.

Having disclosed some basic system components and concepts, the disclosure now turns to the exemplary method embodiment shown in FIG. 4. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

As shown in block 402 a set of disparate climate data collections may be each converted to a common format. The set of disparate climate data collections may include one or more of the one or more of the MERRA-2, ERA-Interim, CFSR, 20CR, JRA-25, and JRA-55 climate reanalysis collections and the forward data processing products. The common format may be, for example, a Network Common Data Format (NetCDF). The conversions may be implemented using the individual conversion utilities 108.1-108.7, each configured to convert a specific one of the plurality of disparate climate reanalysis datasets and forward data processing products from different sources to common format files that are temporally and spatially registered. The commonly formatted collections and products may be converted to flat serialized block compressed sequence files and individual sets of conversion utilities specific to each reanalysis data collection and forward data processing product may be utilized to convert the common format files into the flat, serialized block compressed sequence files used by parallel operation programs, for example, MapReduce, and to load the sequence files into the distributed file system. As mentioned above, the conversion utilities may include a sequencer utility 201, a mapper class 202, a reducer class 203, a record reader/writer utility 204, a driver class 205, and a de-sequencer utility 206.

As shown in block 404, the sequence files may be loaded into a distributed file system. In at least one embodiment, the distributed file system may be implemented using a high-performance data analytics platform 101, including the 367-node Dell cluster described above with an open source Cloudera enterprise-ready distribution of the Apache Hadoop software application and MapReduce engine.

As shown in block 406, a service interface may be provided that maps external client service requests to analytic operations to be performed on the different sourced common format files. The interface may generally provide a portal through which a client device can access the disparate climate data collections 107.1-107.7 via the services library 104, and may include an adapter module 106.1 that maps service requests from external client software applications to specific capabilities of the data analytics service, and a representational state transfer (REST) server module 106.2 that communicatively links the data analytics service to external client software applications.

The requested analytic operations may be implemented over selected ones of the disparate climate data collections. The analytical operations may include a Get Variable By Collection (GetVarByCollection( . . . )) method that can implement a number of commonly-used canonical operations over a combination of the MERRA-2, ERA-Interim, CFSR, 20CR, JRA-25, and JRA-55 reanalysis collections and the forward data processing products. The arguments for the GetVarByCollection( . . . ) method may include one or more of the reanalysis collections and forward data processing products upon which to operate, a temporal and three dimensional spatial extent, a canonical operation to be performed, and any additional parameters needed by the operation. The canonical operations may include, for example, maximum, minimum, sum, count, average, variance, and difference operations, as well as others. As explained in detail above, additional canonical operations that may be used over a combination of the disparate climate data collections may include a seasonal maximum, a seasonal average, a vertical average, a spatial average, an anomaly analysis, and a standard deviation analysis. The requested analytical operations may be adapted or enhanced to accommodate the enhanced temporal and spatial resolution of the forecast data products.

As shown in block 408, data objects may be created from one or more of the different sourced common format files in response to the analytic operations. The services library 104 may implement a plurality of software applications that dynamically create the data objects from the data stored in the distributed file system.

As shown in block 410, the data objects may be delivered to the service interface. The service interface may then deliver the results to the requesting client.

Figure 5:
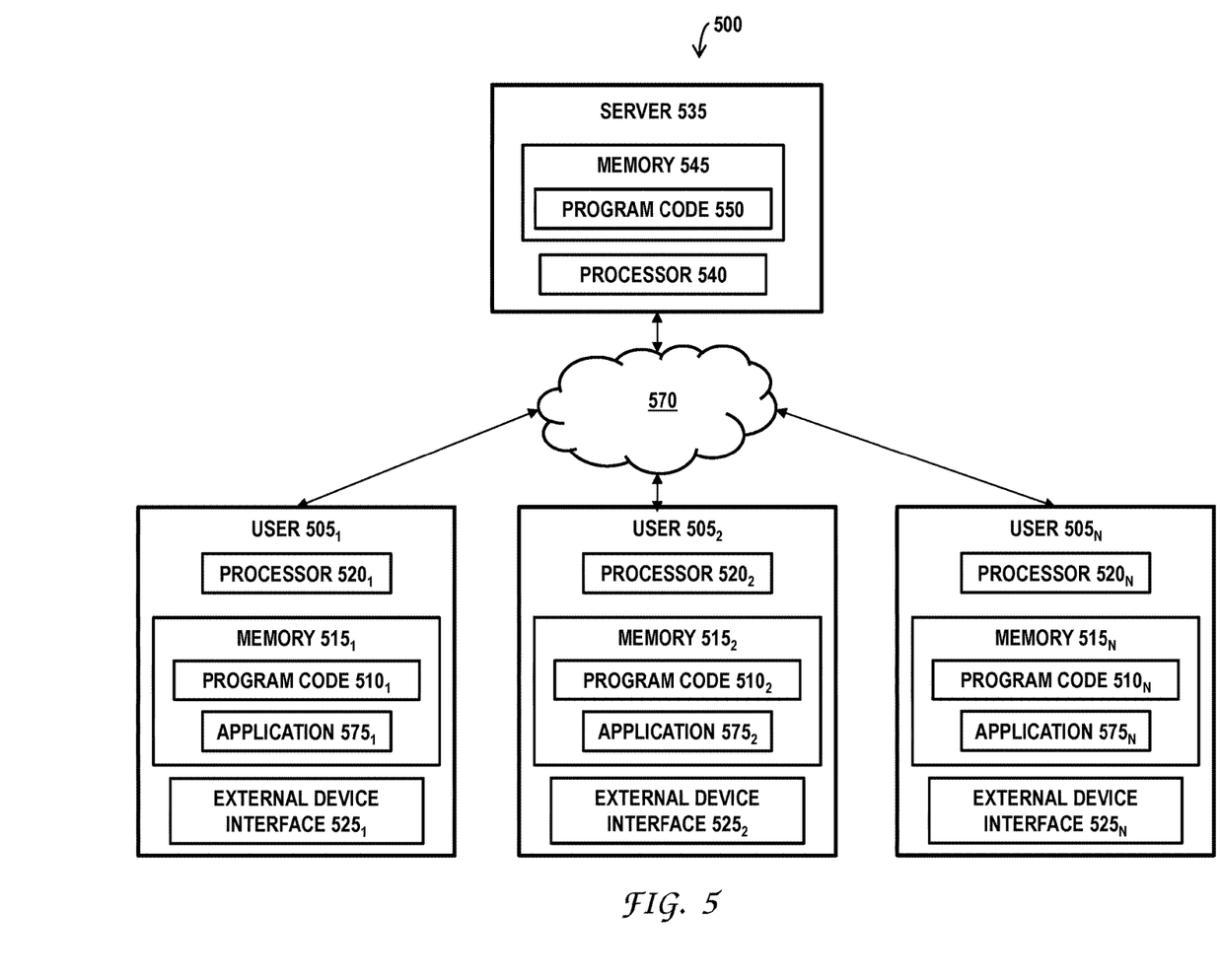
FIG. 5 shows a block diagram of a system according to the disclosed embodiments.

FIG. 5 shows a schematic illustration of an exemplary computing system 500 for practicing the disclosed embodiments. The system 500 may include one or more user terminals 505$_1$-505$_n$. Each user terminal 505$_1$-505$_n$ may include computer readable program code 510$_1$-510$_n$ stored on at least one non-transitory computer readable medium for carrying out and executing the processes described herein. The computer readable medium may include memories 515$_1$-515$_n$, and in alternate aspects, the computer readable program code 510$_1$-510$_n$ may be stored in memories external to, or remote from, user terminals 505$_1$-505$_n$. Memories 515$_1$-515$_n$ may include magnetic media, semiconductor media, optical media, or any media which is readable and executable by a computer. Each user terminal 505$_1$-505$_n$ may also include a processor 520$_1$-520$_n$ for executing the computer readable program code 510$_1$-510$_n$ in a sequential processing configuration. In some embodiments, each user terminal 505$_1$-505$_n$ may include multiple processors 520$_1$-520$_n$ for executing the computer readable program code 510$_1$-510$_n$ in a parallel processing configuration.

At least one embodiment may be limited to a single autonomous user terminal 505, while other embodiments may include multiple user terminals 505$_1$-505$_n$. In some embodiments, one or more of the user terminals 505$_1$-505$_n$ may be connected to each other and optionally to a server 535 through a network 570. The computer readable program code 510$_1$-510$_n$ of one or more of the user terminals may invoke or operate an application 575$_1$-575$_n$ for accessing other user terminals and the server 535.

The server 535 may include a processor 540, and memory 545 storing computer program code 550 for generally operating the server 535 to provide the computing system operations described herein. In some embodiments, the at least one server 535 may be implemented by a cloud computing service, and the processes described herein may be provided in the form of software as a service (SaaS).

The various embodiments described above are provided by way of illustration only and should not be construed to limit the scope of the disclosure. For example, the principles herein apply generally to any large, standardized data set. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

What is claimed is:

1. A reanalysis ensemble service comprising:
 a plurality of conversion utilities, each conversion utility configured to convert a specific one of a plurality of disparate climate data collections from different sources to common format files that are temporally and spatially registered, wherein the disparate climate data collections include reanalysis data sets and forward processing data products;
 a data analytics platform for storing and operating on the different sourced common format files;
 a service interface for mapping service requests to analytic operations performed on the different sourced common format files by the data analytics platform; and
 a services library that dynamically creates data objects from one or more of the different sourced common format files in response to the analytic operations, and delivers the data objects to the service interface.

2. The reanalysis ensemble service of claim 1, wherein each conversion utility comprises:
 a sequencer utility for temporally and spatially registering one of the disparate climate data collections, encoding the one of the disparate climate data collections into sequence files, and for partitioning the sequence files to include a composite key having a timestamp and a climate variable name;
 a mapper class for filtering the partitioned sequence files; and
 a reducer class for creating subsets of the filtered sequence files to be stored in the data analytics platform.

3. The reanalysis ensemble service of claim 1, wherein the reanalysis data sets comprise any combination of: NASA Modern Era Reanalysis for Research and Applications Version-2 (MERRA-2), European Centre for Medium-Range Forecasts ECMWF Interim Reanalysis (ERA-Interim), NOAA NCEP Climate Forecast System Reanalysis (CFSR), NOAA ESRL 20th Century Reanalysis (20CR), Japanese 25-year Reanalysis (JRA-25), Japanese 55-year Reanalysis (JRA-55).

4. The reanalysis ensemble service of claim 1, wherein the forward processing data products comprise a Goddard Earth Observing System Data Assimilation System Version 5 (GEOS-5) model in a Hierarchical Data Format Earth Observing System (HDF-EOS) format.

5. The reanalysis ensemble service of claim 1, wherein the service requests comprise a get variable operation to perform on the common format files, and arguments including one or more climate variables and one or a combination of the disparate climate data collections upon which to operate.

6. The reanalysis ensemble service of claim 1, wherein the service requests comprise a forward processing intercomparison request to perform on the common format files, and arguments including one or more first predictions of a climate variable value generated by the forward processing data products, a three dimensional spatial extent and temporal span, and one or more second predictions of the climate variable value generated by the forward processing data products over the same three dimensional spatial extent, the second predictions having the same temporal span as the one or more first predictions, but offset in time.

7. The reanalysis ensemble service of claim 1, wherein the service requests comprise a reanalysis-forward processing intercomparison request to perform on the common format files, and arguments including one or more first predictions of a climate variable value generated by the forward processing data products, a three dimensional spatial extent and temporal span, and one or more of the reanalysis collections having the same climate variable over the same three dimensional spatial extent, and a temporal span within the one or more reanalysis collections having the same length as the temporal span of one or more first predictions.

8. The reanalysis ensemble service of claim 1, wherein the services library dynamically creates data objects from the common format files utilizing a set of canonical operations operating over a combination of the common format files from different sources, the set of canonical operations comprising:
 a seasonal maximum operation that converts monthly climate variable data to seasonal climate variable data and selects a maximum for selected variables for each grid of 30 or more years over a specified spatial extent;
 a seasonal average operation that converts monthly climate variable data to seasonal climate variable data over a specified time span;
 a vertical average of specified variables across a specified number of vertical levels;
 a spatial average of specified variables over a specified spatial-extent;
 an anomaly determination including a deviation of one or more variables at a certain time interval from an average of the one or more variables over a longer time interval; and
 a standard deviation of one or more variables from a specified set of data values from the combination of the different sourced common format files.

9. A method of providing a climate data reanalysis ensemble service, comprising:
 converting a plurality of disparate climate data collections from different sources to a common format using individual conversion utilities configured to convert a specific one of the plurality of disparate climate data collections from different sources to common format files that are temporally and spatially registered, wherein the disparate climate data collections include reanalysis data sets and forward processing data products;
 storing and operating on the different sourced common format files using a data analytics platform;
 using a service interface to map service requests to analytic operations performed on the different sourced common format files by the data analytics platform; and
 dynamically creating data objects from one or more of the different sourced common format files in response to the analytic operations, and delivering the data objects to the service interface.

10. The method of claim 9, wherein converting the plurality of disparate climate data collections from different sources to a common format using individual conversion utilities comprises:
 temporally and spatially registering the disparate climate data collections;
 encoding the disparate climate data collections into sequence files;
 partitioning the sequence files to include a composite key having a timestamp and a climate variable name;
 filtering the partitioned sequence files; and
 creating subsets of the filtered sequence files to be stored in the data analytics platform.

11. The method of claim 9, wherein the reanalysis datasets comprise any combination of: NASA Modern Era Reanalysis for Research and Applications Version-2 (MERRA-2), European Centre for Medium-Range Forecasts ECMWF Interim Reanalysis (ERA-Interim), NOAA NCEP Climate Forecast System Reanalysis (CFSR), NOAA ESRL 20th Century Reanalysis (20CR), Japanese 25-year Reanalysis (JRA-25), and Japanese 55-year Reanalysis (JRA-55).

12. The method of claim 9, wherein the forward processing data products comprise a Goddard Earth Observing System Data Assimilation System Version 5 (GEOS-5) model in a Hierarchical Data Format Earth Observing System (HDF-EOS) format.

13. The method of claim 9, wherein the service requests comprise performing a get variable operation on the different sourced common format files using arguments including one or more climate variables and one or a combination of the disparate climate data collections upon which to operate.

14. The method of claim 9, wherein the service requests comprise performing a forward processing intercomparison request on the common format files using arguments including one or more first predictions of a climate variable value generated by the forward processing data products, a three dimensional spatial extent and temporal span, and one or more second predictions of the climate variable value generated by the forward processing data products over the same three dimensional spatial extent, the second predictions having the same temporal span as the one or more first predictions, but offset in time.

15. The method of claim 9, wherein the service requests comprise performing a reanalysis-forward processing intercomparison request on the common format files using arguments including one or more first predictions of a climate variable value generated by the forward processing data products, a three dimensional spatial extent and temporal span, and one or more of the reanalysis collections having the same climate variable over the same three dimensional spatial extent, and a temporal span within the one or more reanalysis collections having the same length as the temporal span of one or more first predictions.

16. The method of claim 9, comprising dynamically creating data objects from the different sourced common format temporally and spatially registered files utilizing a set of canonical operations operating over a combination of the different sourced common format temporally and spatially registered files, the set of canonical operations comprising:
converting monthly climate variable data to seasonal climate variable data and selecting a maximum for selected variables for each grid of 30 or more years over a specified spatial extent to compute a seasonal maximum;
converting monthly climate variable data to seasonal climate variable data over a specified time span to compute a seasonal average;
calculating an average of specified variables across a specified number of vertical levels to compute a vertical average;
calculating an average of specified variables over a specified spatial-extent to compute a spatial average;
calculating a deviation of one or more variables at a certain time interval from an average of the one or more variables over a longer time interval to compute an anomaly determination; and
calculating a standard deviation of one or more variables from a specified set of data values from the combination of the different sourced common format temporally and spatially registered files.

17. A system for providing reanalysis ensemble services comprising:
a processor;
a non-transitory computer readable storage medium storing instructions which when executed by the processor, cause the system to:
convert a plurality of disparate climate data collections from different sources to a common format using individual conversion utilities configured to convert a specific one of the plurality of disparate climate data collections from different sources to common format files that are temporally and spatially registered, wherein the disparate climate data collections include reanalysis data sets and forward processing data products;
store and operate on the different sourced common format files using a data analytics platform;
map service requests to analytic operations performed on the different sourced common format files by the data analytics platform;
dynamically create data objects from one or more of the different sourced common format files in response to the analytic operations; and
deliver the data objects to the service interface.

18. The system for providing reanalysis ensemble services of claim 17, wherein the instructions, when executed by the processor, further cause the system to:
temporally and spatially register the disparate climate data collections;
encode the disparate climate data collections into sequence files;
partition the sequence files to include a composite key having a timestamp and a climate variable name;
filter the portioned sequence files; and
create subsets of the filtered sequence files to be stored in the data analytics platform.

19. The system for providing reanalysis ensemble services of claim 17, wherein the instructions, when executed by the processor, further cause the system to perform a forward processing intercomparison request on the common format files using arguments including one or more first predictions of a climate variable value generated by the forward processing data products, a three dimensional spatial extent and temporal span, and one or more second predictions of the climate variable value generated by the forward processing data products over the same three dimensional spatial extent, the second predictions having the same temporal span as the one or more first predictions, but offset in time.

20. The system for providing reanalysis ensemble services of claim 17, wherein the instructions, when executed by the processor, further cause the system to perform a reanalysis-forward processing intercomparison request on the common format files using arguments including one or more first predictions of a climate variable value generated by the forward processing data products, a three dimensional spatial extent and temporal span, and one or more of the reanalysis collections having the same climate variable over the same three dimensional spatial extent, and a temporal span within the one or more reanalysis collections having the same length as the temporal span of one or more first predictions.

* * * * *